(12) United States Patent
Porter

(10) Patent No.: US 6,208,354 B1
(45) Date of Patent: Mar. 27, 2001

(54) METHOD AND APPARATUS FOR DISPLAYING MULTIPLE GRAPHICS IMAGES IN A MIXED VIDEO GRAPHICS DISPLAY

(75) Inventor: Allen J. C. Porter, Thornhill (CA)

(73) Assignee: ATI International SRL, Christchurch (BB)

(*) Notice: Subject to any disclaimer, the term of this patent is extended or adjusted under 35 U.S.C. 154(b) by 0 days.

(21) Appl. No.: 09/185,879

(22) Filed: Nov. 3, 1998

(51) Int. Cl.$^7$ .............................. G06T 11/80; H04N 5/445
(52) U.S. Cl. ............................................. 345/435; 348/563
(58) Field of Search .................................... 345/435, 113, 345/114, 118, 121, 127, 129, 130, 509; 348/511, 513, 552, 564, 565, 567, 588, 589, 600

(56) References Cited

U.S. PATENT DOCUMENTS

| | | | |
|---|---|---|---|
| 5,912,710 | * 6/1999 | Fujimoto | 348/445 |
| 5,969,770 | * 10/1999 | Horton | 348/569 |
| 6,008,860 | * 12/1999 | Patton et al. | 348/565 |
| 6,072,503 | * 6/2000 | Tani et al. | 345/473 |

OTHER PUBLICATIONS

Foley et al "Computer Graphics: Principles and Practice" second edition, Addison–Wesley Publishing Cpmpany, 1993, pp. 806–808.*

* cited by examiner

Primary Examiner—William A. Cuchlinski, Jr.
Assistant Examiner—Thu Nguyen
(74) Attorney, Agent, or Firm—Markison & Reckamp, P.C.

(57) ABSTRACT

A method and apparatus for storing and displaying multiple graphical images in a mixed video and graphics display is accomplished by determining an amount of memory sufficient to display a single graphics image in a subset of the display. Once the amount of memory required for a single image is determined, the pre-allocated portion of memory for graphics images is divided into an array. Graphics images are then rendered and stored within this array. One of the pre-rendered images is selected by a control block, wherein the selection is based on registers or parameters referenced by the control block. A display output engine fetches the selected one of the plurality of pre-rendered graphics images that is stored within the array and combines the selected graphics image with the video data stream to produce a display output stream. The display output stream is then fed to a display device that displays the graphics image.

22 Claims, 2 Drawing Sheets

METHOD AND APPARATUS FOR DISPLAYING MULTIPLE GRAPHICS IMAGES IN A MIXED VIDEO GRAPHICS DISPLAY

FIELD OF THE INVENTION

The invention relates generally to video graphics circuits, and more particularly to a method and apparatus for storing and displaying multiple graphics images in a mixed video graphics display.

BACKGROUND OF THE INVENTION

Video information and graphical information are being combined in an increasing number of applications. Examples include closed captioning of television transmissions, on-screen menus, and television displays that can switch to display a browser for the world-wide web. Typically in these applications, the video information is generated separately from the graphical information and the two must be combined before being outputted to the display device.

In some applications, such as set-top boxes intended to work with television sets in a home environment, the video information is of paramount importance. This is understandable in applications such as digital video discs and digital television where a live video feed is being displayed, and may be displayed in conjunction with graphics information. In such cases, in order to avoid glitches in the video display, the system must ensure that enough bandwidth is provided to fetch and display the video information.

One of the problems associated with combining video and graphics information in a video-intensive application is that the graphics information puts additional loading on the bandwidth and other capabilities of the system. For example, in a system where both the video information and the graphics information is stored in a single memory structure, the fetches of graphical information may interfere with the fetching of video information. In these systems, it is important to minimize the impact that the graphics information retrieval has upon the video information retrieval.

Another problem that can arise in mixed video and graphics circuitry is the amount of memory required to store the video and graphics images. A typical system will allocate an appropriate amount of memory for both the video information and the graphical information based on the size and resolution of the display screen. For example, if a screen is 640×480 pixels, memory will be allocated to display video information at each of those pixel locations as well as graphical information at each of those pixel locations. This is because the actual pixel display is generated based on the combination of the graphics and video information. In many cases this allocation scheme is wasteful as graphics information may only be relevant or present within a small portion of the display.

Therefore a need exists for a method and apparatus that allows video and graphics information to be displayed simultaneously on a screen while improving the efficiency of memory usage with respect to the storage and fetching of graphics information.

DETAILED DESCRIPTION OF A PREFERRED EMBODIMENT OF THE INVENTION

Generally, the present invention provides a method and apparatus for storing and displaying multiple graphical images in a mixed video and graphics display. This is accomplished by determining an amount of memory sufficient to display a single graphics image in a subset of the display. Once the amount of memory required for a single image is determined, the pre-allocated portion of memory for graphics images is divided into an array. Graphics images are then rendered and stored within this array. One of the pre-rendered images is selected by a control block, wherein the selection is based on registers or parameters referenced by the control block. A display output engine fetches the selected one of the plurality of pre-rendered graphics images that is stored within the array and combines the selected graphics image with the video data stream to produce a display output stream. The display output stream is then fed to a display device that displays the graphics image.

By realizing that only a portion of the memory allocated to graphics data is often required in mixed video and graphics applications, the remainder of the memory can be treated as off-screen memory and utilized to store pre-rendered graphics images. Typically pre-rendered graphics images are smaller in size than the entire region allocated to the graphics display, which reduces the amount of data which must be fetched for display. Furthermore, the pre-rendered graphics images do not need to be rendered on the fly, eliminating the additional bandwidth required for rendering. All of these advantages improve the efficiency of the processing system used for displaying the video and graphics information. This reduction in the bandwidth utilized by the graphics portion of the display improves the ability to fetch video information and process this video information without experiencing delays, which in turn allows the video information to be displayed continuously and cleanly.

Figure 1:
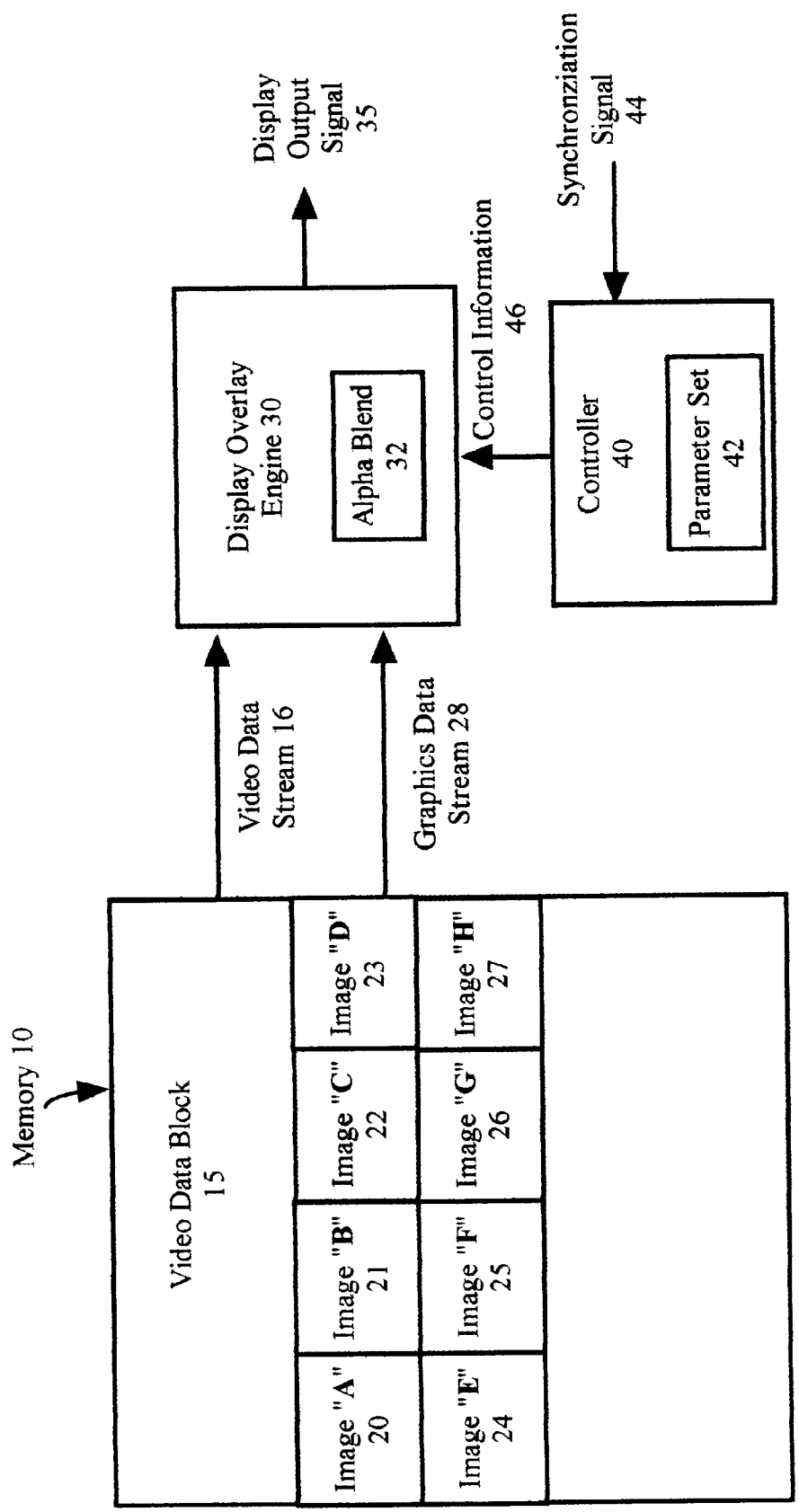
FIG. 1 illustrates a block diagram of a video graphics circuit in accordance with the present invention.
Figure 2:
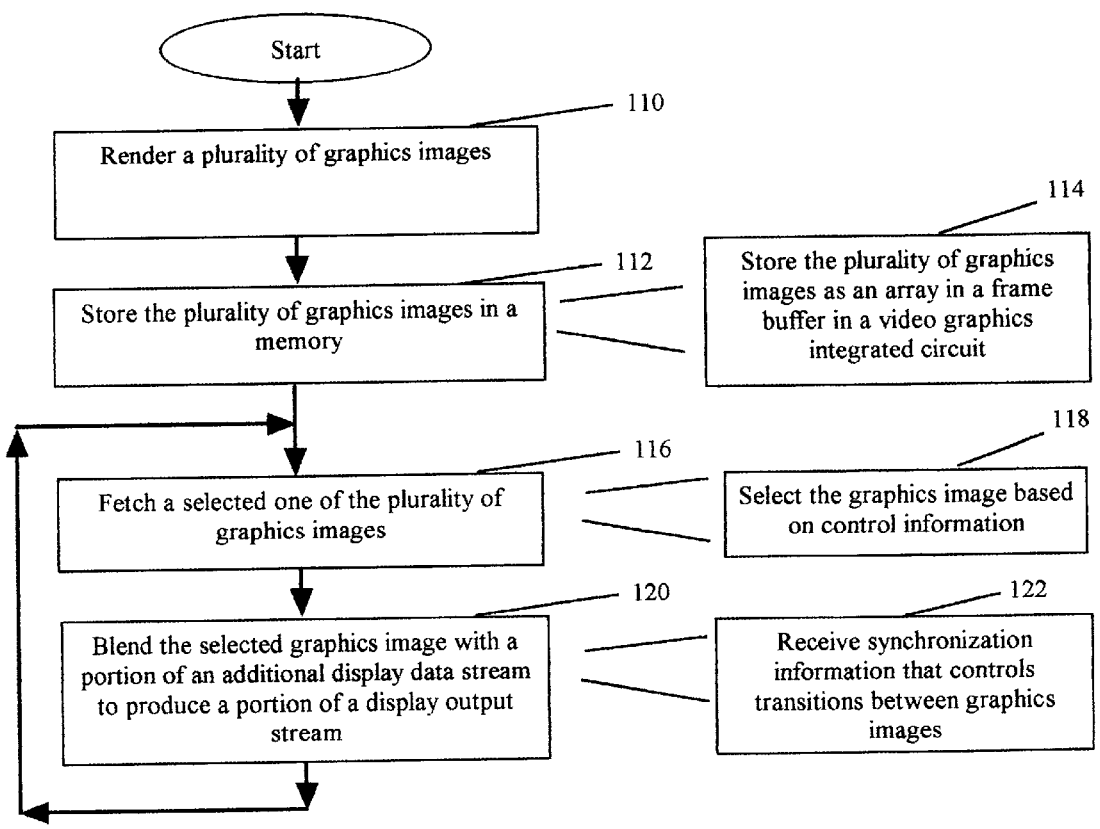
FIG. 2 illustrates a flow chart of a method for generating a display signal in accordance with the present invention.

The invention can be better understood with reference to FIGS. 1 and 2. FIG. 1 illustrates a video graphics circuit that includes a memory 10, a display overlay engine 30, and a controller 40. The video graphics circuit illustrated in FIG. 1 may be a portion of a video graphics integrated circuit used in a set-top box or in other applications that combine video information and graphics information. The memory 10 stores graphics information for display. The memory 10 may be a single memory device or a plurality of memory devices. Such memory devices may included read-only memory, random access memory, floppy disk memory, hard disk memory, system memory, reprogrammable memory, magnetic tape memory, DVD memory, and/or any device that stores digital information.

Preferably, the memory 10 is a dynamic random access memory that is utilized as a frame buffer within the video graphics circuit. In such a system, the memory 10 may also store video data block 15 that includes the video data for display. The video data may be received in a data stream that also includes the graphics data stored in the memory 10. Preferably, the video data stream includes video data in an MPEG format, which is a common standard in the industry. The video data may initially be received in a compressed format within the stream that would require decompression before it is stored in the memory 10. If the video data and the graphical information are combined in the same data stream which is received, parsing or some other extraction technique may be required in order to separate the video information from the graphics information.

The graphics information that is stored in the memory 10 is illustrated in FIG. 1 by a number of separate images 20–27 which are stored within a portion of the memory 10. The amount of memory allocated to the graphics information within the memory 10 is based on the resolution of the display and its dimensions. In some applications, the entire display will be utilized for graphics information. Examples would include text editing applications or web browsers that may be incorporated in a set-top box that allows video transmissions to be received, internet access, and stand-alone computing applications. In these applications where the entire screen may be dedicated to graphics information, it is important to have enough memory reserved for this purpose. Because of this, the memory 10 will be partitioned such that a block of memory 10 is specifically set aside for graphics information.

However, in many cases only a small portion of the screen will be used to display graphics information. In such situations, only a small portion of the memory 10 which has been set aside for graphics information needs to be utilized. By recognizing that a large amount of the memory 10 that has been set aside is not being actively used for generating display information, this memory can be used for other purposes. This underutilized memory may be effectively treated as off-screen memory, which describes memory that is not currently being displayed and thus can be modified without effecting the display. By utilizing this off-screen memory to store pre-rendered graphics images, memory usage can become more efficient and overall bandwidth usage reduced.

The graphics images 20–27 are pre-rendered prior to use. Pre-rendered images are graphics images that are rendered by a rendering block within the system and stored in the memory in anticipation of their future use. The example illustrated in FIG. 1 shows eight images within the portion of the memory 10 dedicated to the graphics display. Each of the images 20–27 may include a number of bytes of data equivalent to a maximum of ⅛th of the memory 10 allocated to the graphics display. In other words, the graphics display memory is separated into eight sub-blocks, each of which stores one of the images 20–27. It should be apparent to one skilled in the art that the number of images that can be stored within the block of memory allocated to graphics information is based on the amount of memory allocated and the size of each of the images. Similarly, it should be obvious that not all of the memory allocated to graphics information needs to be used to store pre-rendered images, and portions of the allocated memory can be used for other purposes.

Once the images 20–27 have been stored in the memory 10, they can be individually selected and combined with video data or data from another source by the display overlay engine 30. The display overlay engine 30 is operably coupled to the memory and receives the graphics data stream 28 and the video data stream 16. In other embodiments, the graphics data stream 28 will be retrieved from the memory 10 whereas another display data source may be received from another block within the system other than the memory 10. For example, a stream of video information may be fed directly into the system rather than fetched from the memory 10. In other embodiments, the graphics data stream 28 may be combined with additional data streams or multiple video data streams or any combination thereof to generate the display output signal 35.

Therefore, the display overlay engine 30 reads at least a portion of the graphics information stored in the memory 10 and blends it with one additional data display source to produce the display output signal 35. The additional display data source illustrated in FIG. 1 is the video data stream 16. Preferably, the portion of the graphics information that is fetched from the memory 10 includes one of the images 20–27. Which of the images 20–27 that is fetched is determined based on control information 46 received from the controller 40.

The graphical images 20–27 may comprise a sequence of images that when displayed sequentially create an animated sequence on the screen. An example might be a spinning logo that would be placed in one corner of the screen. In such an example image A 20 may show the logo in a first position, where images B–H 21–27 would comprise subsequent versions of the original image 20. When displayed in sequence, the images would create the effect of animation.

The controller 40 stores the control information 46 in a parameter set 42 which may include a number of registers that store information describing the location of the selected image. The registers within the parameters set 42 may be double buffered such that when a synchronization signal 44 is received the data in the registers are updated simultaneously such that transitions between images are achieved at a predetermined time. The predetermined time is typically based on the synchronization signal 44 such that updates to the image occur during a period of time in which the image is not being actively drawn to the display. Basing the image transitions on the synchronization signal 44 avoids tearing or other undesired distortion effects that may occur if the update is performed while the display is drawing the portion of the display that includes the image.

Preferably, the parameters set will include a pointer to one of the graphics images 20–27 stored within the memory 10. The registers may also store the pitch of the graphics images stored within the memory 10. The pitch determines the width or number of bytes within each stored line of the graphics image. The registers may also store a clip area definition that defines the area within the display in which the graphics information is to be displayed. Multiple clip areas may be present within the display, and each clip area may be configured to display video or graphics images.

Additional registers may determine whether or not the graphics information stored within each of the images 20–27 is stored in a packed or planar format. A packed format will combine additional data with the graphics information that is used in the display. The data is stored in this combined or packed format to facilitate more efficient memory accesses in that all of the required data can be obtained in a single fetch to a localized area within the memory. An example is the packing of the alpha values for each of the pixels within the graphics image. The alpha value determines the level of translucence of the graphics image with respect to the video information that may be co-resident on the display with the graphics information. Packing this alpha value with other pixel information such as color can have beneficial effects on the time it takes to fetch the complete set of data required to output the image to a display. A detailed description of preferable packing and interleaving techniques that may be applied to video or graphics data that improve memory fetching efficiency is present in a co-pending patent application filed on the same day as this application, having a title of "METHOD AND APPARATUS FOR STORING AND DISPLAYING VIDEO IMAGE DATA IN A VIDEO GRAPHICS SYSTEM" and an attorney docket number of 0100.01320.

In other embodiments, the alpha value for an entire graphics region may be represented with a single value that is shared by all of the data points within the region.

Similarly, a set of alpha components that are utilized for one graphics image stored in the memory 10, may be re-used for multiple images. In some systems, alpha components are stored for each of the pixel locations on the display, but assuming that a clip area has been defined, the system may require only alpha values for the clip region. In such a system, a fixed alpha value, which may be zero, can be used for the areas of the display outside the clip region.

If a planar storage technique is utilized in storing graphics images in the memory 10, an additional register may point to the alpha plane or other data planes stored in the memory 10, where these additional data planes make up portions of the graphics images 20–27. In a planar storage technique, one plane contains information such as color, while another plane may contain the alpha values for the graphics image. Based on the storage format chosen, the parameter set 42 can be configured to support the storage format such that the set of parameters required to fetch the data for one of the images 20–27 can be stored, updated, and relayed to the display overlay engine 30.

The parameter set 42 within the controller 40 may also include a scaling parameter that is utilized to scale graphics information stored in the memory 10 prior to display. In situations where a clip area has been defined within the parameter set 42, the scaling factor may be based on the ratio between the clip area region and the scaling or aspect ratio of the images 20–27 stored within the memory 10.

When the controller 40 receives the synchronization signal 44, it updates the parameter set 42 such that control information 46 is fed to the display overlay engine 30. The display overlay engine 30 than fetches one of the images 20–27, where these images have been pre-rendered and stored in the memory 10. The display overlay engine 30 then blends the graphics data stream 28 containing the selected image with another data stream to produce the display output signal 35. Preferably, the additional data stream with which the graphics data stream 28 is blended is video data stream 16. As stated earlier, graphics data stream 28 may include MPEG video data.

The display overlay engine 30 may also include alpha blend block 32 that blends the graphics data stream 28 and the video data stream 16 in such a way that translucence effects may be achieved. Alpha blending is commonly used in the art for this purpose. In some applications, keying may be used instead of alpha blending. Keying combines graphics and video information based on one or the other being dominant. This may be analogized to an alpha blending operation where either the video data stream 16 or the graphics data stream 28 has an alpha value of one indicating that it is exclusively displayed in at least a portion of the display.

Controller 40 may include a processor which reads a set of instructions such that when executed by the processor the set of instructions will cause the processor to operate in a predetermined manner such that the processor updates the parameters within the parameter set 42 based on the synchronization signal 44. The processor may be a single processing entity or a plurality of processing entities. Such a processing entity may be a microprocessor, microcomputer, microcontroller, central processing unit, digital signal processor, state machine, a set of logic circuitry, and/or any device that manipulates information based on operational instructions. Thus, the controller 40 may control updates to the parameter set 42 using a combination of software and hardware or through a complete software implementation. Because the synchronization signal 44 is an intermittent signal that is based on the display, there is typically enough time between assertions of the synchronization signal 44 to perform all of the register updates using software. However, some situations may warrant a hardware implementation in order to increase the speed or off-load the processor within the controller 40.

As stated above, the entire amount of memory 10 allocated to graphics information may not be required to store the plurality of images required for a certain clip area within the display. In such cases, the memory that is not utilized for image storage may be treated as off screen memory and used for other purposes. In addition to this, numerous clip areas may be defined within the display, wherein each of the clip areas has a plurality of images associated with it stored within the memory 10. Each of these pluralities of images could then be utilized separately to generate the graphics display for each of the clip areas.

In other embodiments that modify the system illustrated in FIG. 1, display overlay engine 30 may receive a plurality of data streams that it blends to form the display output signal 35. The plurality of data streams may include numerous video data streams, graphics data streams, and/or other data streams that can be blended together to form the display output signal 35. Each of these individual data streams fed to the display overlay engine 30 may be used in conjunction with clip area definitions such that each of the data streams is displayed within a small portion of the screen. In addition to this, a separate controller similar to controller 40 may control each of the data streams received by the display overlay engine 30. In this way, each of the data streams may be independently controlled to produce the display output signal 35.

Because each of the images 20–27 is pre-rendered prior to use, memory bandwidth is saved as each of the images does not have to be rendered and then stored within the memory 10 while the system is fetching and displaying graphics information from the memory 10. The overhead associated with rendering and storing the images is absorbed during the initialization of the system. By removing this overhead from the system early on, memory bandwidth utilization is reduced during actual display operations. Efficient memory usage on the part of the graphics portion of the video graphics circuit enables the video data stream 16 to be displayed in real time without glitches or other problems associated with lack of adequate memory bandwidth. In a system such as a set-top box where the video information is of primary importance, this reduction in memory bandwidth usage by the graphics portion of the display is of great importance.

FIG. 2 illustrates a method for generating a display signal in a system that blends two data streams to produce the display signal. At step 110, a plurality of graphics images are rendered based on received graphics data or internally generated graphics data. At step 112, the plurality of graphics images is stored in a memory. The storage of the images may be accomplished at step 114, in which the plurality of graphics images are stored in an array within a frame buffer in a video graphics integrated circuit. The array structure may be based on the size of the graphics images and the amount of memory allocated to the graphics portion of the display within the frame buffer. The frame buffer within such a system may also store video information that is to be combined with the graphics information for display.

At step 116, a first one of the plurality of graphics images is fetched from the memory, or frame buffer. This may be accomplished at step 118 by selecting the graphics image based on control information generated based on timing signals such as a synchronization signal. The synchronization signal may be used to update registers that are within a control block, where the registers determine which of the plurality of graphics images is selected.

At step 120, the selected graphics image is blended with a portion of an additional display data stream to produce a portion of the display output stream. Thus in a system where the additional display data stream is a video data stream, the selected graphics image will be blended with the incoming video stream to produce the display output stream. The blending operation may include an alpha blending operation as described above with respect to FIG. 1. The blending of the selected graphics image with the additional display data stream causes the two streams to be merged to produce the display output signal. Note that a number of display data streams may be merged at this point to form the display output stream.

Once the initial graphics image has been blended with the additional display data stream, a transition will occur where the selected one of the plurality of graphics images will change. In other words a second one of the plurality of graphics images will be selected for output. As illustrated in step 122, the transition between graphics images may be controlled based on the synchronization information. Once the graphics image for display has been updated, the new graphics image is fetched from the memory at step 116, and blended at step 120 with the additional display data stream to produce the display output stream. This process can be repeated continuously such that each of the plurality of graphics images is eventually selected and merged with the display data stream. It may be the case that the successive fetching and displaying of the plurality of graphics images generates an animation sequence within the portion of the screen allocated to the graphics images.

In a preferred example system utilizing the method of FIG. 2, a video graphics system which receives a stream of MPEG video data may fetch successive graphics images from memory and blend them with the MPEG data stream. This may be used in a set-top box application that is coupled to a High Definition Television (HDTV). The multiple pre-rendered graphics images may be used to display a spinning logo or other graphics icon. Because these images have been pre-rendered and stored in memory prior to display, the bandwidth associated with storing the rendered graphic images is consumed during initialization or at another reduced-bandwidth time period. This allows the video data associated with the HDTV, which requires a great deal of memory bandwidth resources, to be fetched and processed while the graphics images are being displayed without having a negative impact on the display.

In addition to the advantages associated with pre-rendering the graphics images, less bandwidth is used to fetch the small blocks of image data than would typically be used to fetch the entire block of memory allocated to graphics data. Understanding that only a subset of the screen is going to be utilized allows the unused portions of memory to be freed up for use as off-screen memory, uses of which include storing the plurality of pre-rendered graphics images.

It should be understood that the implementation of other variations and modifications of the invention and its various aspects should be apparent to those of ordinary skill in the art, and that the invention is not limited to the specific embodiments described. For example, rather than storing a plurality of graphics images that are used to generate an animated sequence on the display, a static graphics image may be stored in a small portion of the memory allocated to the graphics display, allowing the remainder of the graphics memory to be utilized for other purposes. It is therefore contemplated to cover by the present invention, any and all modifications, variations, or equivalents that fall in the spirit and scope of the basic underlying principals disclosed and claimed herein.

What is claimed is:

1. A video graphics circuit that efficiently utilizes memory bandwidth, the video graphics circuit comprising:

a memory, wherein the memory includes a portion allocated to storing graphics information, wherein the portion allocated to storing graphics information is greater than an amount of memory sufficient to store graphics information to be displayed as a single image in a portion of a display, wherein excess memory of the portion allocated to storing graphics information is divided into an array, and wherein the array contains a plurality of pre-rendered graphics images for future display; and a display overlay engine operably coupled to the memory, wherein the display overlay engine fetches one of the plurality of pre-renderd graphics images from the array to produce a fetched pre-rendered graphics image and blends the fetched pre-rendered graphics image with at least one additional display data source to produce a display output signal to be provided to the display.

2. The video graphics circuit of claim 1, wherein the display overlay engine further comprises alpha blending circuitry that performs alpha blending operation on the fetched pre-rendered graphics image and the at least one additional display data source.

3. The video graphics circuit of claim 1, further comprising a controller operably coupled to the display overlay engine, wherein the controller controls fetching of the plurality of pre-rendered graphics images by the display overlay engine and manipulates a plurality of parameters used to select one of the plurality of pre-rendered graphics images for fetching.

4. The video graphics circuit of claim 3, wherein the controller receives a synchronization signal, wherein the plurality of parameters is updated based on the synchronization signal such that switching between pre-rendered graphics images occurs at a predetermined time.

5. The video graphics circuit of claim 4, wherein the plurality of parameters includes a scaling factor, wherein the scaling factor is applied to each of the plurality of pre-rendered graphics images to produce a scaled display image.

6. The video graphics circuit of claim 5, wherein the plurality of parameters includes a clip area definition, wherein the clip area definition defines a portion of the display in which the plurality of pre-rendered graphics images are to be displayed, and wherein the scaled display image is rendered in the portion of the display defined by the clip area definition.

7. The video graphics circuit of claim 4, wherein the controller includes a processor, wherein the processor reads a set of instructions such that when executed by the processor, the set of instructions cause the processor to operate in a predetermined manner such that the processor updates the parameters based on the synchronization signal.

8. The video graphics circuit of claim 1, wherein the at least one additional display data source includes video data.

9. The video graphics circuit of claim 8, wherein the memory further comprises a frame buffer on a video graphics chip, wherein the frame buffer stores the video data, the graphics information to be presently displayed as a single image in the portion of the display, and the plurality of pre-rendered graphics images.

10. The video graphics circuit of claim 9, wherein the video data is derived from an MPEG data stream.

11. The video graphics circuit of claim 1, wherein the plurality of pre-rendered graphics images includes a plurality of images that, when displayed sequentially, create an animated sequence.

12. A method for generating a display signal, the method comprising the steps of:

allocating a portion of memory for storing graphics information to produce an allocated portion of memory, wherein the allocated portion of memory is greater than an amount of memory sufficient to store graphics information to be displayed as a single graphics image in a portion of a display;

determining the amount of the allocated portion of memory sufficient to display the single graphics image in a portion of the display;

dividing a remaining amount of the allocated portion of memory into an array;

rendering a plurality of graphics images to produce a plurality of rendered graphics images;

storing the plurality of rendered graphics images in the array;

fetching a first one of the plurality of rendered graphics images from the array to produce a fetched graphics image; and blending the fetched graphics image with a first portion of an additional display data stream to produce a first portion of a display output stream.

13. The method of claim 12, wherein the steps of rendering ad storing occur during initialization of a mixed video graphics system that includes the memory and the display.

14. The method of claim 12, further comprising the steps of:

fetching a second one of the plurality of rendered graphics images from the array to produce a second fetched graphics image; and blending the second fetched graphics image with a second portion of the additional display data stream to produce a second portion of the display output stream.

15. The method of claim 14, wherein the step of blending further comprises the step of receiving synchronization information, wherein the synchronization information controls transition between the first one of the plurality of rendered graphics images and the second one of the plurality of rendered graphics images.

16. The method of claim 12, wherein the step of fetching further comprises the step of receiving control information, wherein the control information selects the first one of the plurality of rendered graphics images from the plurality of rendered graphics images.

17. The method of claim 12, wherein the step of blending further comprises the step of blending the fetched graphics image with a video data stream.

18. The method of claim 17, wherein the step of blending further comprises the step of blending the fetched graphics image with an MPEG video data stream.

19. The method of claim 12, wherein the array resides within a frame buffer of a video graphics integrated circuit.

20. The method of claim 12, wherein the steps of fetching and blending are repeated such that each of the plurality of rendered graphics images is sequentially blended with subsequent portions of the additional display data stream to produce the display output stream.

21. The method of claim 20, wherein the sequential blending repeats after a last image of the plurality of rendered graphics images has been blended, and wherein blending each of the plurality of rendered graphics images with subsequent portions of the additional display data stream produces an animated sequence of graphics images in the display output stream.

22. A video graphics integrated circuit that efficiently utilizes memory bandwidth, the video graphics integrated circuit comprising:

a frame buffer, wherein the frame buffer includes a first portion allocated to storing graphics information and a second portion allocated to storing video data, wherein the first portion is greater than an amount of memory sufficient to store graphics information to be displayed as a single image in a portion of a display, wherein excess memory of the first portion is divided into an array, and wherein the array stores a plurality of pre-rendered graphics images for future display;

a display overlay engine operably coupled to the frame buffer, wherein the display overlay engine fetches video data from the second portion of the frame buffer to produce fetched video data and a selected graphics image of the plurality of pre-rendered graphics images from the array to produce a fetched pre-rendered graphics image, and wherein the display overlay engine combines the fetched video data and the fetched pre-rendered graphics image to produce a video graphics output stream; and a controller operably coupled to the display overlay engine, wherein the controller selects one of the plurality of pre-rendered graphics images stored in the array as the selected graphics image.

* * * * *